(No Model.)

E. O. SIMMONS.
COMBINATION GARDEN TOOL.

No. 588,757. Patented Aug. 24, 1897.

Witnesses
Edmund H. Strause
Wm. F. Doyle

Inventor
Elbert O. Simmons
By H. B. Willson,
Attorney

THE NORRIS PETERS CO., PHOTO-LITHO., WASHINGTON, D. C.

UNITED STATES PATENT OFFICE.

ELBERT O. SIMMONS, OF ENGLEVALE, NORTH DAKOTA.

COMBINATION GARDEN-TOOL.

SPECIFICATION forming part of Letters Patent No. 588,757, dated August 24, 1897.

Application filed November 28, 1896. Serial No. 613,806. (No model.)

*To all whom it may concern:*

Be it known that I, ELBERT O. SIMMONS, a citizen of the United States, residing at Englevale, in the county of Ransom and State of North Dakota, have invented certain new and useful Improvements in Combination Garden-Tools; and I do declare the following to be a full, clear, and exact description of the invention, such as will enable others skilled in the art to which it appertains to make and use the same.

My invention has relation to improvements in the construction of combination garden tools or implements, and more especially to that class used by hand, and the object is to combine several implements for convenience.

To this end the novelty consists in the construction, combination, and arrangement of the same, as will be hereinafter more fully described, and particularly pointed out in the claim.

In the accompanying drawings the same figures of reference indicate the same parts of the invention.

Figure 1:
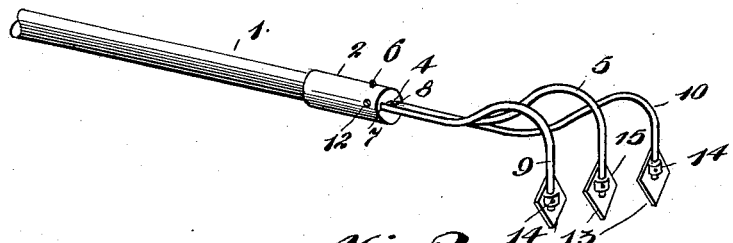
Figure 2:
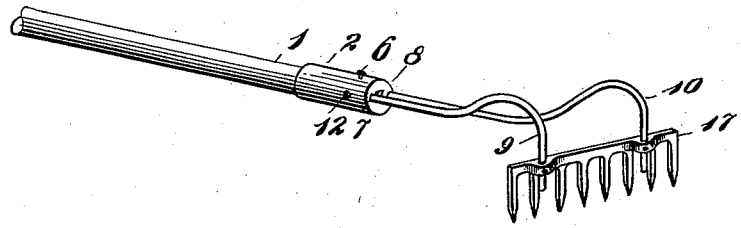
Figure 3:
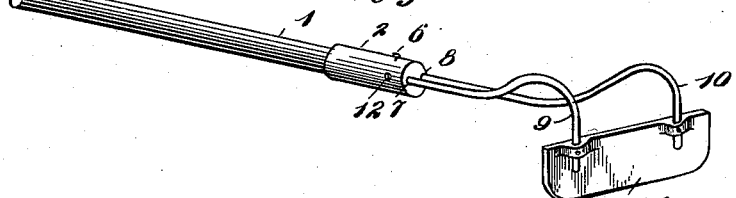
Figure 4:
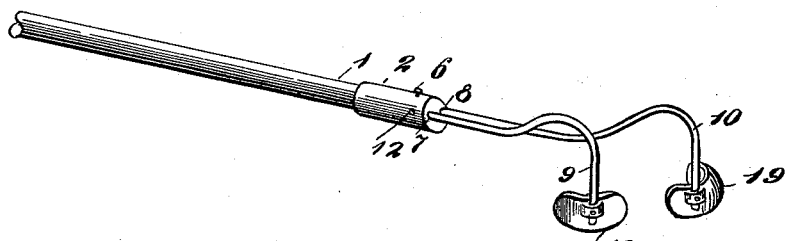
Figure 5:
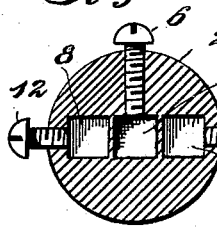

Figure 1 is a perspective view of an implement embodying my invention. Fig. 2 shows the tool organized as a rake. Fig. 3 represents it as a hoe. Fig. 4 shows the tool assembled as a cultivator, and Fig. 5 is a transverse section of the socket.

1 represents the helve or handle, provided with a metal socket 2. This socket is formed with a central longitudinal rectangular orifice 3, which receives the correspondingly-shaped shank 4 of the arm 5, which is removably and adjustably secured in said socket by the thumb-screw 6.

7 and 8 represent longitudinal parallel rectangular orifices in the socket, one of which is located on each side of the central orifice 3. These receive the rectangular shanks of the cylindrical spring-arms 9 and 10, which are secured therein by the set-screws 12 12.

13 13 represent the detachable cultivator-blades, which are preferably diamond-shaped, so as to be reversed end for end when necessary. They are provided with sockets 14 and a set-screw 15, by means of which they are secured to the outer ends of the rectangular shanks of the spring-arms 9 and 10.

It will be noticed that the cylindrical free ends of the spring-arms are turned at a right angle to the rectangular shanks, and thus facilitate the adjustment of the blades 13 both vertically and at an inclination to each other on their respective axes.

16 repesents the hoe-blade, and 17 the rake-bar.

18 and 19 represent the detachable covering-blades, which may be adjusted at an angle to the central cultivator-blade to throw the soil from each side in toward the center of the road.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

The handle 1 provided with cylindrical socket 2, formed with the longitudinal parallel rectangular orifices 3, 7 and 8, and the set-screws 6 and 12, a series of cylindrical spring-arms provided with rectangular shanks, the free ends of said arms being turned at an approximately right angle to their rectangular shanks, in combination with a series of reversible cultivator-blades adapted to be detachably secured to the cylindrical free ends of said spring-arms, substantially as shown and described.

In testimony whereof I hereunto affix my signature in presence of two witnesses.

ELBERT O. SIMMONS.

Witnesses:
P. H. ROURKE,
G. F. WARNER.